United States Patent [19]
Nilsson

[11] 4,182,376
[45] Jan. 8, 1980

[54] DEVICE FOR DISPENSING A LIQUID FLOWING THROUGH A SUBSTANTIALLY VERTICAL TUBE

[75] Inventor: Bernt Nilsson, Forsheda, Sweden

[73] Assignee: Forsheda Gummifabrik AB, Forsheda, Sweden

[21] Appl. No.: 822,873

[22] Filed: Aug. 8, 1977

[51] Int. Cl.² ........................................... F16K 13/00
[52] U.S. Cl. ........................................ 137/874; 52/16;
137/357; 137/561 A
[58] Field of Search .................. 137/357, 561 A, 873,
137/874; 52/16

[56] References Cited
U.S. PATENT DOCUMENTS
1,852,999  4/1932  Griffith ........................... 137/559

Primary Examiner—Gerald A. Michalsky
Attorney, Agent, or Firm—Albert L. Jeffers; John F. Hoffman

[57] ABSTRACT

A dispensing device for dispensing a liquid flowing through a substantially vertical tube, particularly for dispensing rain water flowing through a drainpipe wherein a sleeve has a circumferential resiliently deformable wall portion which is adjustable into two different positions, namely a first position in which the inner surface of the wall portion, possibly together with the end portion of the pipe, provides the collecting pocket, and a second position in which the inner surface is substantially conical for not collecting and discharging any liquid letting the liquid pass through the sleeve.

3 Claims, 3 Drawing Figures

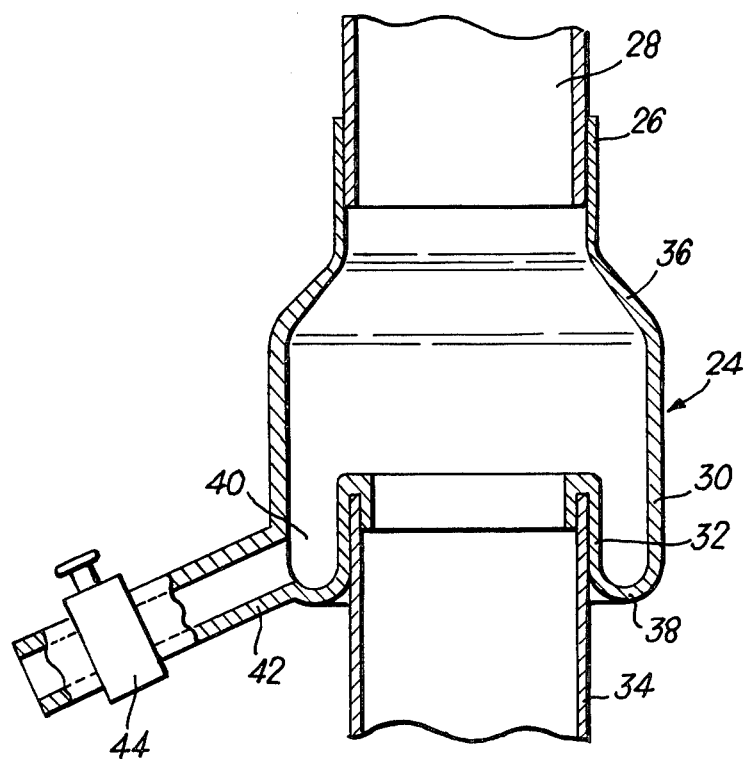

DEVICE FOR DISPENSING A LIQUID FLOWING THROUGH A SUBSTANTIALLY VERTICAL TUBE

BACKGROUND OF THE INVENTION

1. Field of the Invention

The present invention relates to a dispensing device for dispensing a liquid flowing through a substantially vertical tube, particularly for dispensing rain water flowing through a drainpipe.

2. Description of the Prior Art

Many times it is desirable to use rain water for irrigation purposes. An old and well-known method for doing so is to have a drainpipe discharge into a water butt in which the water is collected. A drawback is, however, that the water cannot be used when the rain is hard and long lasting so that the water butt overflows which in turn causes moisture damage to buildings close to the water butt. Also other kinds of drawbacks can occur.

SUMMARY OF THE INVENTION

Therefore, it is an object of the present invention to provide a dispensing device for dispensing particularly rain water flowing through a drainpipe, said device being integrated in a drainpipe leading to a sewage pipe and adapted to either discharge the rain water from the drainpipe and direct it to a desired place or to direct it into the sewage pipe.

According to the invention this object is achieved in that the dispensing device comprises a sleeve attached to two end portions of a pipe said end portions defining a gap therein and said sleeve bridging said gap, and has at its inner surface a circumferential collecting pocket to which is connected at least one discharge pipe for discharging liquid collected in said pocket.

In a preferred embodiment of the invention the sleeve has a circumferential resiliently deformable wall portion which is adjustable into two different positions namely a first position in which the inner surface of said wall portion, possibly together with said end portion of said pipe, provides said collecting pocket, and a second position in which said inner surface is substantially conical for not collecting and discharging any liquid letting said liquid pass through said sleeve.

When using the inventive dispensing device connected to a drainpipe the discharge opening could, for example, be connected to a water butt for storing the water therein, or the opening could be connected to a perforated hose which leads to places often parched for irrigating said places. Such places could be found, for example, under projecting roofs or the like.

BRIEF DESCRIPTION OF THE DRAWINGS

The invention is to be described more in detail below with reference to the accompanying drawings.

FIG. 3 shows an axial sectional view of a second embodiment of the device according to the invention.

DESCRIPTION OF THE PREFERRED EMBODIMENT

Figure 1:
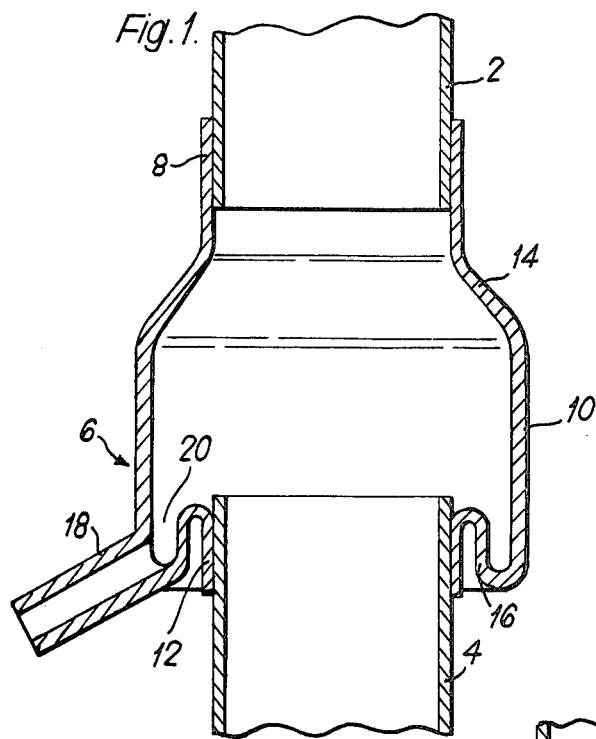
FIG. 1 shows an axial sectional view of a first embodiment of the inventive device, said device being in its first position.

In FIG. 1 the reference numbers 2 and 4 refer to an upper and a lower portion of a drain pipe respectively said drain pipe discharging into a sewage pipe for surface water. To said portions 2 and 4 of the drainpipe in a gap therein there is connected a sleeve 6 made from rubber. The sleeve 6 has an attaching portion 8 attached to the upper portion 2 of the drainpipe, an intermediate portion 10, an attaching portion 12 attached to the lower portion 4 of the pipe and one upper 14 and one lower 16 connecting portion between the portions 8 and 10 and between the portions 10 and 12 respectively. The connecting portion 16 is provided with a discharge pipe 18 to which a conduit of any kind could be connected.

By displacing the intermediate portion 10 of the sleeve 6 upwards or downwards in a vertical, axial direction the sleeve can be adjusted into two different positions. In the position illustrated in FIG. 1 the lower connecting portion 16 together with the portion 4 of the drainpipe projecting therein provide a collecting pocket 20 whilst the upper connecting portion 14 has a substantially conical shape. Rain water flowing downwards in the drainpipe will mainly follow the inner surface thereof and will also follow the inner surface of the sleeve 6 down into the collecting pocket 20. From the pocket 20 the water is discharged through the discharge opening 18. Any surplus rain water will flow over the upper edge of the pocket 20 into the portion 4 of the drainpipe and from there to the sewage pipe. The rain water flowing from the discharge pipe 18 can be led either to a water butt for storing the water therein or to an irrigating conduit being placed on the ground and being provided with perforations. From the position shown in FIG. 1 the intermediate portion 10 can be displaced upwards to a position shown in FIG. 2 in which position the connecting portions 14 and 16 have shapes and functions changed relative to those of FIG. 1. In the position according to FIG. 2 the upper connection portion 14 is situated above the circumferential downwardly directed edge 22 of the upper portion 2 of the drainpipe, from which edge the water flowing along the inner surface of said portion 2 falls down through the sleeve 6 in a curtain-like manner. In the position shown in FIG. 2 the connecting portion 16 has a substantially conical shape and the discharge pipe 18 is situated in such a manner that the curtain-like flow of water leaving the edge 22 hits the connecting portion 16 radially inwardly of said discharge pipe 18. Due to this all the rain water flowing through the sleeve 6 will be directed to the portion 4 of the drain pipe so that no discharge of rain water occurs from the discharge pipe 18.

In order to facilitate displacing the intermediate portion 10 upwardly and downwardly to either of its two positions the intermediate portion 10 can have a greater wall thickness than the connecting portions 14 and 16 or it can be provided with some kind of stiffening or reinforcing element.

Figure 2:
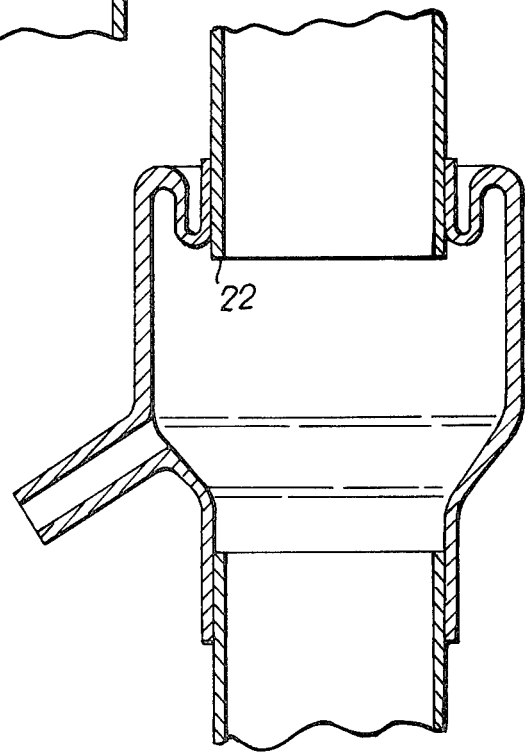
FIG. 2 shows the device of FIG. 1 in the second position.

In FIG. 3 there is shown an embodiment of the invention substantially corresponding to the device of FIGS. 1 and 2 in the position thereof shown in FIG. 1. However, the embodiment of FIG. 3 is not adjustable between different positions but in this embodiment the sleeve 24 is made from plastics or any other relatively stiff material. The sleeve has an upper attaching portion 26 for attaching the sleeve to an upper portion 28 of a drain pipe, an intermediate portion 30, a lower attaching portion 32 for attaching the sleeve to a lower portion 34 of a drainpipe and an upper conical connecting portion 36 and a lower connecting portion 38, said lower connecting portion providing a collecting pocket 40 for collecting rain water flowing through the drainpipe and the sleeve. The connection portion is provided with a discharge pipe 42, said pipe being provided with a valve 44. When rain water is to be discharged from the dispensing device through the discharge pipe 42 the valve 44 is opened.

The invention can be modified within the scope of the appended claims. Of course, the dispensing device according to the invention can be used in other applications where it is desired to dispense liquids flowing through vertical pipes.

I claim:

1. A dispensing device for dispensing a liquid flowing through a substantially vertical pipe, particularly for dispensing rain water flowing through a drainpipe, wherein the device comprises: a sleeve attached to two end portions of a pipe, said end portions defining a gap in said pipe and said sleeve bridging said gap, said sleeve having at its inner surface a circumferential collecting pocket to which is connected at least one discharge pipe for discharging liquid collected in said pocket, said sleeve comprising a circumferential resiliently deformable wall portion being adjustable into two different positions, namely, a first position in which the inner surface of said wall portion provides at least a portion of said collecting pocket, and a second position in which said inner surface is substantially conical for not collecting and discharging any liquid, and letting said liquid pass through said sleeve.

2. A dispensing device according to claim 1 wherein: the intermediate portion of said sleeve has a greater diameter than the pipe, said deformable wall portion connects the lower end of said intermediate portion to an end portion of said sleeve, said end portion being attached to said pipe, a second circumferential resiliently deformable wall portion connects the upper end of said intermediate portion to a second end portion of said sleeve, said second end portion being attached to said pipe, and said second wall portion in said first position has a substantially conical inner surface for directing liquid flowing from above along the walls of said sleeve into said collecting pocket and in said second position is withdrawn to let the end portion of said pipe provide a downwardly directed circumferential edge from which liquid flowing through the sleeve falls in a curtain-like manner through said sleeve radially inwardly of the intermediate portion thereof and radially inwardly of said discharge pipe in said first deformable wall portion.

3. A dispensing device according to claim 1, wherein said sleeve is integrally made from rubber.

* * * * *